Sept. 22, 1959   O. HINZE   2,905,284
UPPER CHORD LOCKING DEVICE FOR FALSEWORK CARRIERS
Filed Dec. 22, 1954

Inventor:
OTTO HINZE
By
ATTORNEY

United States Patent Office 2,905,284
Patented Sept. 22, 1959

2,905,284

UPPER CHORD LOCKING DEVICE FOR FALSEWORK CARRIERS

Otto Hinze, Hannover-Kleefeld, Germany

Application December 22, 1954, Serial No. 476,873

1 Claim. (Cl. 189—37)

The present invention relates to adjustable metallic falsework carriers and more particularly to a locking device disposed in the upper chord to prevent displacement of adjacent falsework carrier elements.

Falsework carriers according to Patent 2,687,193 are comprised of single elements butt jointed in the line of the upper chord and connected by means of continuously length adjustable connecting means in the line of the lower chord to form the falsework carrier. While in general the falsework carrier is dismounted completely after use and its single elements are again assembled to form a falsework carrier before the next use, sometimes the need arises to transport the single elements in assembled condition, i.e. the falsework carrier as a whole unit without the necessity to disassemble it for this purpose.

Such a condition may arise if, for instance, the ceilings of a lower floor in the same building have been constructed by means of the falsework carrier. As the ceilings in the upper floors have the same span, it would be uneconomical to disassemble the falsework carrier into its single component parts before effecting this short range transport, thus to transport its single elements and then again to assemble them to form the falsework carrier. In such cases it is more reasonable to transport the falsework carrier as a whole from the lower to the upper floor. When doing so is naturally inavoidable that especially in the plane of abutment also tensile strains or transversal forces arise in the zone of the falsework carrier which after being placed into position was exposed to compressive strain only and in which zone the end to end abutment was fully sufficient to transfer the compressive strains. In order not to strain the tension connection excessively by taking up these forces, upper chord locking devices have been provided which are designed as short threaded bolt connections and which purpose is to take up the tensile and transversal forces. But the operation of such threaded bolt connections requires unnecessary man hours during the assembly of the carrier and also when being removed, and in particular because due to the structural arrangement these threaded bolts are badly accessible.

The present invention has therefore for its object to secure the upper chords of the falsework carrier without the aid of threaded bolts and provide such a design of this locking device that the latter is reliably able to take up and to transfer all compressive, tensile and transversal forces.

The upper chord locking device for falsework carriers designed according to Patent 2,687,193 which is proposed according to the present invention to solve this problem is characterized by the arrangement of horn shaped projecting hooks at the front end of one of the upper chords to be secured and by roller shaped abutments to contact said hooks, these abutments being arranged at the front end of the other upper chord member adjacent the place of joint, and the whole is used in connection with locking means of the upper chord excluding displacements in the plane of abutment.

A number of differently designed embodiments are possible. First of all, a rail shaped hook projecting over the width of the upper chord can be provided at each upper chord, an abutment roller of corresponding length being assigned to each hook. It is also possible to provide for each upper chord at least two finger shaped hooks projecting over the width of the upper chord with corresponding abutment faces arranged in opposite position.

Also regarding the design of the locking means, different possibilities can be realized. An especially suitable locking means can be provided if the locking members are designed as a tongue projecting the one end of the upper chord and a groove receiving this spring in the front face of the adjacent upper chord. Groove and tongue can be disposed at a level corresponding approximately to the plane which is parallel to the line of the upper chord and comprises the centers of curvature of the horn shaped hooks, because this arrangement facilitates in especially simple and convenient manner to bring the horn shaped hooks in contact with the abutments or to remove them from such contacting position. A sort of articulation is formed, if tongue and groove of the locking device effective in the plane of abutment have semi-circular cross sections. But it is already sufficient to design tongue and groove in such a manner that locking of the upper chords is only effected in the direction which is opposite to that direction in which the transversal forces are received by the hooks and the abutments.

In this case tongue and groove of the locking means effective in the plane of abutment have the cross section of a rectangular triangle where the one cathetus of which is approximately perpendicular to the plane of abutment, while the surface comprising the other cathetus has a course corresponding approximately to a plane which is radial to the hook arrangement, and the surface corresponding to the hypotenuse lies approximately in the front face of the upper chord. In each case, the hooks and the abutments and also the tongue and groove are formed by end flanges which are attached, e.g. welded to the upper chords. Thereby, the surfaces required for the devices designed according to the above explained arrangement can be easily realized.

It is the nature of this proposal that lowering movements of the falsework carrier elements comprising the upper chords can be effected without difficulties for the purpose of removing the falsework carrier, while, however, cambering can only be realized by means of an elastic deformation of the falsework carrier. For, after cramping of the falsework carrier elements by means of the horn shaped projecting hooks and the abutments lying in contact with these hooks and after locking has been effected in the plane of abutment, and after the connection of the lower chord members has been established by means of turnbuckles provided according to Patent 2,687,193, the falsework carrier forms a rigid beam which can be only cambered, if an appropriate positive allowance is provided with the cramping and locking means. But, as this can be undesirable, there arises the further problem to design the upper chord locking device so that cambering of the falsework carrier can be effected as well as the lowering of same without making use of elastic deformation of the falsework carrier.

This problem is solved whereby the front ends of the upper chords are designed in the manner of an anti-friction bearing. All advantages of the falsework carrier designed according to the Patent 2,687,193 are being maintained thereby. For, even in case of designing the front ends of the upper chord elements in the manner of an anti-friction bearing, the property of the falsework carrier to absorb in the butt joint, which is formed by such an anti-friction bearing now as before, compressive forces arising in the upper chord are maintained, so that there is no necessity to provide any other connecting means in the upper chord. But also the advantages of the upper chord locking device described above remain unchanged because cramping and locking are maintained, so that such a falsework carrier has an upper chord locking device which allows to transport the falsework carrier as a whole unit without disassembling it and to use it at another place of the same building, provided lowering the falsework carrier is not done to such an extent as would be required for disassembling it.

In this connection it has provide to be reasonable to displace the ranges of cramping and locking when viewed in the direction of the upper chords. The structural set up of the upper chords is thereby considerably simplified without unfavorably influencing the locking effect. In particular it seems to be advantageous to arrange the means serving to secure the upper chord ends against displacement in the planes of abutment at both sides of the projecting horn shaped hooks and the roller shaped abutments by means of which the cramping of the upper chords is effected. Thereby, the possibility is provided to design these locking means also as projecting horn shaped hooks which would then be used in place of a tongue, and abutments to contact these hooks would be used in place of a groove. In this case, the hook serving the locking needs only to be given a direction which is opposite to the direction of the hooks serving the cramping in order to obtain a bracing which is extremely stable, and the degree of movability of which depends only on it, whether the faces of the abutments are more or less curved. If the radius of curvature is infinitely great, there arise again the conditions which necessitate elastic deformations of the falsework carrier if a camber shall be given to it, while the other limiting case is given by the provision of the abutments which is required in order to carry the falsework of arched supporting structures such as bridges, vaults, tunnels, channels or the like.

Several embodiments of the invention are illustrated in the accompanying drawings by way of example.

Figure 3:
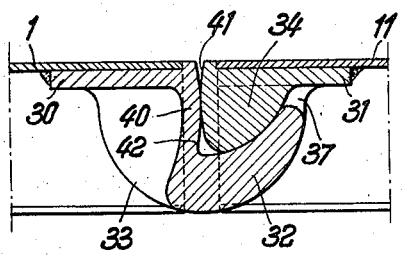
Figures 3 and 4 are sections on lines III—III of Figure 2.
Figure 4:
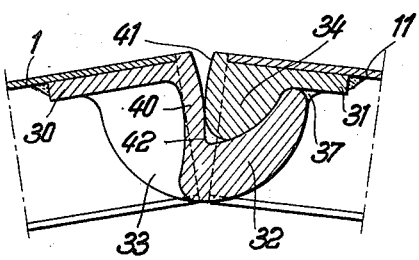
Figure 5:
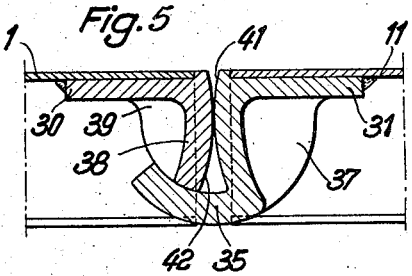
Figures 5 and 6 are sections on lines V—V of Figure 2.
Figure 6:
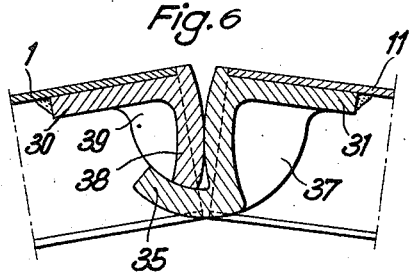
Figure 2:
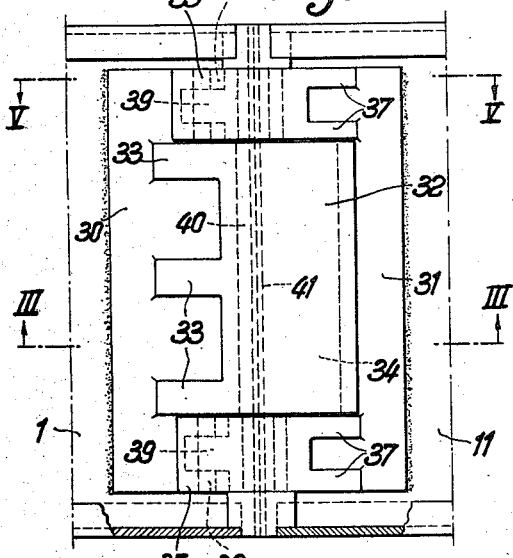
Figure 2 is a bottom plan view of the joint members.
Figure 1:
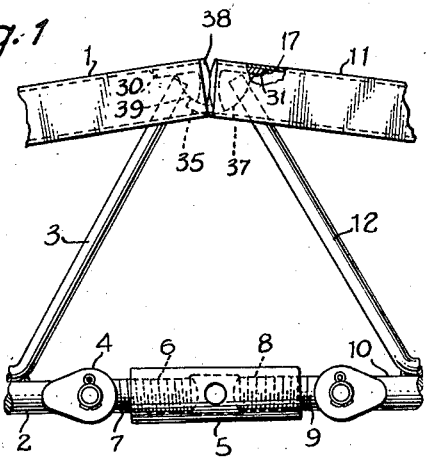
Figure 1 is a side elevation partly in section showing a preferred form of releasable locking butt joint employed in a falsework carrier.

In Fig. 1 first of all the fundamental design of a falsework carrier according to Patent 2,687,193 can be seen, the point of end to end abutment of two falsework carrier elements being shown in this illustration. The left element is comprised of the upper chord 1, the lower chord 2 and the diagonal bracing 3.

The turnbuckle is hinged at numeral 4 to the lower chord 2. This turnbuckle receives the threaded pin 7 of the left falsework carrier element in the one of its threaded recesses designated by the numeral 6, while the other threaded recess 8 serves to receive the threaded pin 9 having the function to establish the articulated connection with the lower chord 10 of the falsework carrier element represented in the right half of the illustration. This falsework carrier element represented in the right half of the illustration has again an upper chord 11 and a diagonal bracing 12 for the lower chord 10. The front faces 13 and 14 of the two upper chords 1, 11 are again butt jointed. These faces are formed by the flanges 15, 16 which have substantially a rectangular fundamental shape.

The connection between the parts 1 and 30 on the one hand and between the parts 11 and 31 on the other is effected by means of welding beads which can be seen at numeral 17. In all figures, the numerals 1 and 11 designate the upper chord ends of two falsework carrier elements at that point.

It is assumed in this case that the upper chords have a U-shaped cross section. The flange parts 30, 31 are welded to the front ends of the U-irons 1, 11. The flange part 30 forms a horn or arcuate shaped projecting hook 32, fins 33 supporting the hook 32. The hook 32 is, as shown by Fig. 14, merely disposed in the center of the length of flange when viewed in the direction of the width of the upper chords 1, 11. The roller or arcuate shaped abutment 34 of the flange part 31 which is contacted by the hook 32 extends over a corresponding width. The means which secure the upper chord ends 1, 11 in the plane of abutment are disposed at the sides of the hook and abutment arrangement 32, 34 serving the cramping of the upper chord ends 1, 11. These means are also comprised of horn or arcuate shaped projecting hooks 35 which in this case are formed by the flange part 31 so that the direction of these hooks is opposite to the direction of the hooks 32. Fins 37 provide for the necessary rigidity of the hooks 35. The hooks 35 are in contact with the abutments 38 which in their turn are again formed by the flange part 30. Fins 39 reinforce the abutments 38.

The connecting piece 40, which according to the invention is designed as the one part of an antifriction bearing, lies between the parts 30 and 32, while the abutment 34 forms a bearing surface at 41 which is opposite to the bearing surface 42 of the connecting piece 40. Thus, a rolling contact joint 40, 34 having the bearing surfaces 42, 41 is formed. This rolling contact joint provides for the possibility to adjust greater cambers of the falsework carrier as can be seen from the illustrations represented in the Figs. 11 and 13.

It can be seen that the cramping of the upper chord ends in the reach of the width of the hook 32 is effected by the latter and by means of the corresponding abutment, while hooks 35 and parts 38 effect the locking of the upper chord ends against displacement in the plane of abutment at the two sides of the hook 32.

In addition, as represented in Figs. 11 and 13, the possibility is provided to adjust any desired degree of camber of the falsework carrier by means of the antifriction bearing represented in the drawings.

It is in the nature of the locking device proposed according to the invention that the upper chords of two adjacent falsework carrier elements, when being in a position in which the locking device is effective, can be connected by means of an additional locking device, so that the falsework carrier elements remain in connection with each other also when the connection of the lower chord is completely released. This can be effected, e.g., thereby that the free legs of the U-shaped upper chord of the one falsework carrier are provided with ears, while the free ends of the U-shaped upper chord of the adjacent element have slewable hooks which can be inserted into the ears. An upper chord connection locked in this manner and secured according to the invention is still maintained even if the lower chord connection is released.

I claim:

A light weight, structurally self-contained, sectional lattice beam structure, suited to engage supports at its ends and to be loaded between said supports, comprising: a top member of at least two sections which abut end to end in their load bearing position and react against each other directly in thrust; a releasably locking butt joint between adjacent said top sections including end bearing faces on said top sections which form a rolling contact butt joint; a first projection of arcuate shape adjacent the abutting face of at least one top section, said projection being centrally located transversely of the joint; means defining a first complementary abutment on the adjacent section receiving and engaging said first projection; second and third arcuate projections on said adjacent section, disposed on opposite sides of said first abutment; and means defining second and third abutments complementary to said second and third projections and disposed on said one top section on opposite sides of said first projection receiving and engaging said second and third projections; a bottom member composed of a like number of sections which are aligned and react in tension, said top and bottom members being of substantially the same length; means connecting the top and bottom members of each section together in spaced relation; tension connecting means joining the sections of the bottom member, the tension connecting means between at least one pair of sections being positively adjustable in length; whereby an upward camber may be produced in the upper surface of the structure such that deflection produced by the ultimate superimposed working load will substantially neutralize said camber.

References Cited in the file of this patent
UNITED STATES PATENTS

| | | |
|---|---|---|
| 22,035 | Savage | Nov. 9, 1858 |
| 937,817 | Kreidler | Oct. 26, 1909 |
| 1,558,184 | Kluender | Oct. 20, 1925 |
| 2,687,193 | Hinze | Aug. 24, 1954 |